United States Patent [19]
Bell

[11] 3,908,466
[45] Sept. 30, 1975

[54] MUD WEIGHING UNIT
[75] Inventor: Leo A. Bell, Santa Ana, Calif.
[73] Assignee: Martin-Decker Company
[22] Filed: Nov. 5, 1973
[21] Appl. No.: 412,769

[52] U.S. Cl............................................... 73/45 L
[51] Int. Cl.².......................................... G01N 9/00
[58] Field of Search............................. 73/452, 153

[56] References Cited
UNITED STATES PATENTS
2,459,542  1/1949  Rosenberger ...................... 73/45 L
2,604,444  7/1952  Piccardo ............................. 259/18

FOREIGN PATENTS OR APPLICATIONS
87,034    1956   Norway ............................. 73/45 L Primary Examiner—James J. Gill
Assistant Examiner—Anthony V. Ciarlante
Attorney, Agent, or Firm—Pravel & Wilson

[57] ABSTRACT

A mud weighing unit wherein a float is suspended in a container through which mud flows in such a manner that variations in the mud density are continuously determined and with a minimum effect due to the flow of the mud.

7 Claims, 3 Drawing Figures

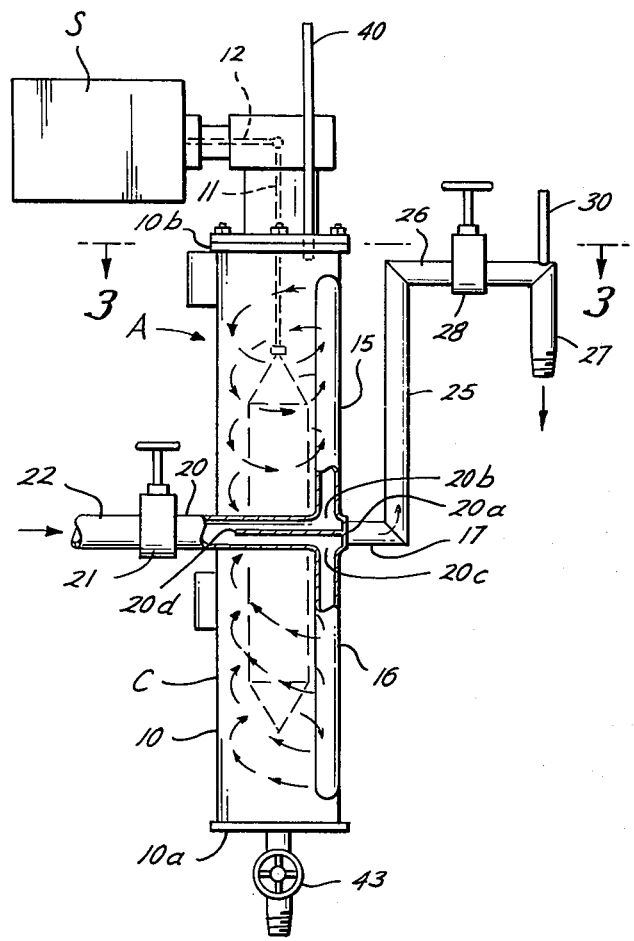
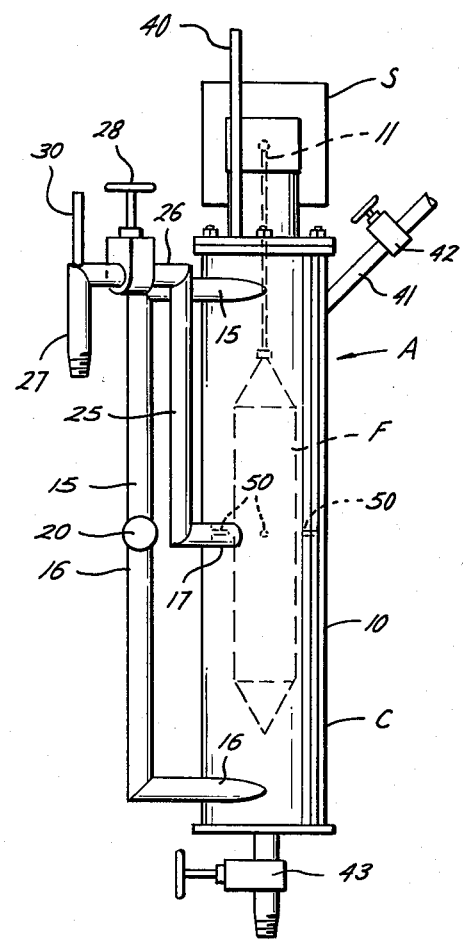
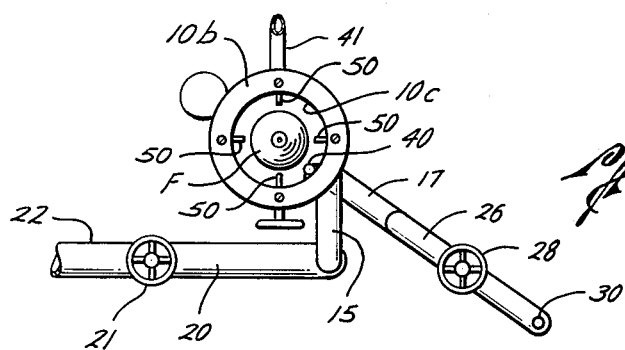

MUD WEIGHING UNIT

BACKGROUND OF THE INVENTION

The field of this invention is mud weighing units.

At oil well sites, drilling mud is circulated in the well bore and back to the surface where its density is checked frequently. Variations in the density of the mud indicate varying conditions in the well itself, such as the presence of gas, all of which is well known.

Efforts have been made in the past to provide apparatus for obtaining continuous readings of the mud density, an example of which is disclosed in my U.S. Pat. Application Ser. No. 178,714, filed Sept. 8, 1971, and now issued as U.S. Pat. No. 3,782,199, as well as the prior art cited therein, and U.S. Pat. Nos. 1,604,387; 2,459,542; and 2,598,827.

SUMMARY OF THE INVENTION

The present invention relates to new and useful improvements in mud weighing units, wherein the unit has a chamber with a float therein operably connected to a sensing unit, with means for maintaining the chamber full of the mud flowing therethrough, and with additional means to minimize flow effects of the mud on the float, whereby accurate density measurements are continuously made, which are essentially as accurate as when no fluid flow occurs.

BRIEF DESCRIPTION OF THE DRAWINGS

FIG. 1 is a view, partly in elevation and partly in section, illustrating the apparatus of this invention;

FIG. 2 is a side view of the apparatus of this invention; and

FIG. 3 is a sectional view taken on line 3—3 of FIG. 1.

DESCRIPTION OF THE PREFERRED EMBODIMENT

In the drawings, the letter A designates generally the mud weighing unit of this invention which includes a chamber C having a float F therein which is operably connected to a sensing unit S. Mud such as drilling mud used in connection with the drilling of oil wells, is caused to flow through the chamber C in a particular flow pattern, as will be described hereinafter in detail, so that variations in the density of the mud flowing through the chamber C are sensed by the sensing unit S and are suitably indicated on a continuous basis with a minimum of flow effect from the flow of the mud through the chamber C.

Considering the invention more in detail, the chamber C is preferably formed by a housing 10 having a lower plate 10a and a upper plate or cover 10b which essentially close the chamber C, except as noted hereinafter. The float F which is disposed within the chamber C is preferably a hollow element completely enclosed with air or gas therein and which is formed of brass or other suitable material. The float F is weighted by any suitable means such as additional metal secured to the float F, or by the metal itself forming the body of the float F, so that the float is heavier than the equivalent volume of the heaviest mud which is ever to be weighed by the apparatus A. As will be explained in more detail, the float F is suspended on a rod 11 which extends through an opening 10c in the cover 10b (FIG. 3), so that the rod 11 is connected to a movable arm 12 forming part of the sensing unit or sensor S.

Preferably the sensor or sensing unit S is of any conventional construction such as illustrated in my copending U.S. Ser. No. 178,714, identified hereinabove. Such sensor or sensing unit S is actuated in response to the variations in the density of the mud within the chamber C by reason of the buoyancy of the float F. As will be well understood by those skilled in the art, the sensing unit S provides a signal by means of air pressure or electrically which may be indicated by any suitable means (not shown) so that there is a continuous indication of the variations of the mud density flowing through the chamber C.

To minimize the effect of the flow of the mud or liquid through the chamber C so that the float F responds to the variations in the mud density rather than effects from the flow of the mud, the present invention includes an upper inlet pipe 15 and a lower inlet pipe 16, both of which are preferably disposed so that the mud is directed into the interior of the chamber C tangentially and so that the mud flows from the lower end towards the center of the chamber C from the lower inlet 16 and from the upper end towards the center of the chamber C from the upper inlet 15. Thus, the flow of the mud is in a gentle, whirlpool motion indicated generally in FIG. 1 of the drawings which prevents channelling or dead spots in the mud within the chamber C. Also, the flow effects of the incoming mud are balanced out by reason of their opposing each other in both directions from the upper inlet 15 and the lower inlet 16 so that there is substantially no longitudinal force applied to the float F by reason of the flow of the drilling mud through the chamber C. An outlet pipe 17 is disposed at the dead center of the chamber C opposite the center of the float F and midway between the inlet 15 and the inlet 16 so as to assure the control of the fluid flow with the minimum of velocity effect on the float F.

To assure that the fluid flow into the chamber C is substantially equal through the inlets 15 and 16, the inlets 15 and 16 are connected to a common inlet pipe 20 which terminates at 20a and with a divider plate 20d centrally mounted therein which communicates at 20b into the pipe 15 and at 20c into the pipe 16 so that the mud flowing through the common inlet pipe 20 is split and divided equally between the two pipes 15 and 16. A control valve 21 is provided with the line 20 so as to control the volume of the mud flowing into the line 20 from the line 22 which is connected to a pump or other source of drilling mud being supplied to the apparatus A.

The outlet 17 is connected to a discharge pipe 25 which extends upwardly alongside the chamber C to a height which is level with the upper end of the chamber C. A pipe 26 extends horizontally from the pipe 25 to a final discharge connection 27 which preferably extends downwardly for the discharge of mud to any suitable location such as a mud pit or tank.

Preferably, a control valve 28 is disposed in the discharge line 26 for regulating the flow and also for regulating the level of the mud within the chamber C as will be more fully explained hereinafter. A syphon breaker is provided with the apparatus A in the form of a tube 30 which extends upwardly from the pipe 26 and is vented to the atmosphere so that the combination of the discharge pipes 17, 25, 26 and 27 do not serve as a syphon.

The chamber C is kept full of mud at all times by a combination of the valves 21 and 28 with a tube 40, as will be explained, and identified in the claims as "mud level control means". The tube 40 extends into the mud in the upper end of the chamber C and it also extends upwardly so that it can be visually observed. Preferably, the tube 40 is made of a clear plastic so that when mud is in the tube 40, it can be seen by the operator. The tube 40 also serves to degas the mud by allowing any gas which is in the mud to escape through the tube 40 and this prevents an interface in the chamber C between the mud and any gas which may be separated therefrom, which interface would normally interfere with an accurate indication of the density of the mud by the float F. The chamber C is kept substantially full of mud at all times by controlling the flow of the mud therethrough with the valves 21 and 28 so that the mud stands up in the tube 40 above the upper end of chamber C so that the operator knows that the chamber C is full of mud at all times.

The lower end of the chamber C has a drain valve 43 mounted in the lower plate 10a for the draining of mud from the container or chamber C when it is desired to clean same. Also, a flushing liquid inlet pipe 41 having a valve 42 therewith is mounted near the upper portion of the chamber C and is disposed for directing flushing liquid into the chamber C and specifically to the upper portion of the float F so as to wash settlings from the mud from the upper end of the float F where they often tend to collect. The flushing pipe 41 may be connected to water or any other flushing liquid so as to completely wash down the inside of the chamber C and allow the contents to drain out through the drain line 43 when it is desired to clean the chamber C and the float F therein. Such periodic cleaning of the unit A is desirable so as to maintain the accuracy of the indications obtained by the movement of the float F.

To control the lateral displacement of the float F it is desirable to have a plurality of stablizing fingers 50 in the interior of the chamber C which are spaced from the exterior of the float F, usually about one-eighth of an inch. Such stablizing fingers 50 limit the lateral or horizontal movement of the float F which might otherwise result in an inaccurate indication at the sensor unit S.

In the operation or use of the unit A of this invention, it is disposed in proximity to a source of drilling mud at an oil well in the known manner. Line 22 is connected to the source of the drilling mud and the mud is supplied thereto, usually with a pump (not shown) so that the mud is directed through the valve 21 and into the inlet pipe 20. The separator or divider plate 20d which is within the pipe 20 divides the mud flow so that one-half of the mud flows upwardly through the pipe 15 and the other half of the mud flows downwardly through the pipe 16. The tangential inlets 15 and 16 into the chamber C produce a whirlpool gentle flow of the mud within the chamber C in opposite directions to each other as they approach the outlet 17 and thereby flow outwardly from the chamber C.

The chamber C is kept full of mud at all times by adjusting the valves 21 and 28 so that the chamber C is full and the mud stands at a visible level in the clear tube 40 at all times.

The float F responds by reason of its buoyancy to the variations in the density of the mud flowing through the chamber C, and such buoyancy response of the float F is transmitted to the sensor or sensing unit S so that the variations in the mud weight or density are indicated on a chart or otherwise to the operator.

The foregoing disclosure and description of the invention are illlustrative and explanatory thereof, and various changes in the size, shape and materials as well as in the details of the illustrated construction may be made without departing from the spirit of the invention.

I claim:

1. A drilling mud weighing unit, comprising:

a chamber adapted to receive mud therein and having an upper end, a lower end, a chamber side wall between said ends, an upper inlet and a lower inlet with an outlet midway between said inlets for the flow of mud therethrough;

mud level control means communicating with said chamber and the atmosphere exterior thereto for maintaining said chamber full of mud and degassing means at the upper end of the chamber for degassing the mud to prevent collecting gas in said chamber;

a float suspended in said chamber for buoyant response to variations in the density of the mud in said chamber;

said upper inlet being through said side wall and below said upper end of said chamber;

said lower inlet being through said side wall and above said lower end of said chamber;

said inlets being disposed for directing incoming mud in a substantially tangential direction relative to said side wall of said chamber for causing circular mud flow completely around said float from each of said inlets to said outlet for substantially equalizing the mud forces acting on said float therearound and for its full length, whereby channeling of the mud flow is prevented and thereby erratic inaccurate responses by said float are inhibited;

a common inlet pipe externally of said chamber connected to said inlets;

divider means in said common inlet for substantially equally dividing the inlet flow of mud to said inlets to thereby substantially equalize the longitudinal flow forces acting on said float as the mud flows through said chamber;

a sensing unit connected to said float for sensing changes in buoyancy of said float in response to variations in the density of the mud in said chamber; and said float being disposed substantially midway between said upper inlet and said lower inlet so that mud flow in said chamber is in opposite longitudinal directions relative to said float and towards said outlet for minimizing flow effects of the mud on said float.

2. The structure set forth in claim 1, including:

a discharge pipe connected to said outlet from said chamber and extending up to the upper end of said chamber; and a syphon breaker with said discharge pipe for preventing siphoning of mud from said chamber.

3. The apparatus set forth in claim 1, including:

drain means with said chamber for draining the mud from the chamber; and flushing liquid inlet means for directing flushing liquid into said chamber and through said drain means.

4. The apparatus set forth in claim 3, wherein: said flushing liquid inlet means is positioned for directing the flushing liquid to the top of said float for cleaning mud settlings therefrom.

5. The apparatus set forth in claim 1, including:
means suspending said float at its upper end only whereby it swings laterally with respect to the vertical axis of said float; and
stabilizing finger means for limiting lateral swinging of said float.

6. The structure set forth in claim 1, wherein: said mud level control means comprises a transparent tube into which mud from said chamber may rise to provide a visual indication that the chamber is full of mud.

7. The structure set forth in claim 1, wherein said divider means includes a plate extending longitudinally and disposed midway in common inlet pipe for forcing a substantially equal division of the mud flow to said upper inlet and said lower inlet.

* * * * *